Patented Dec. 25, 1923.

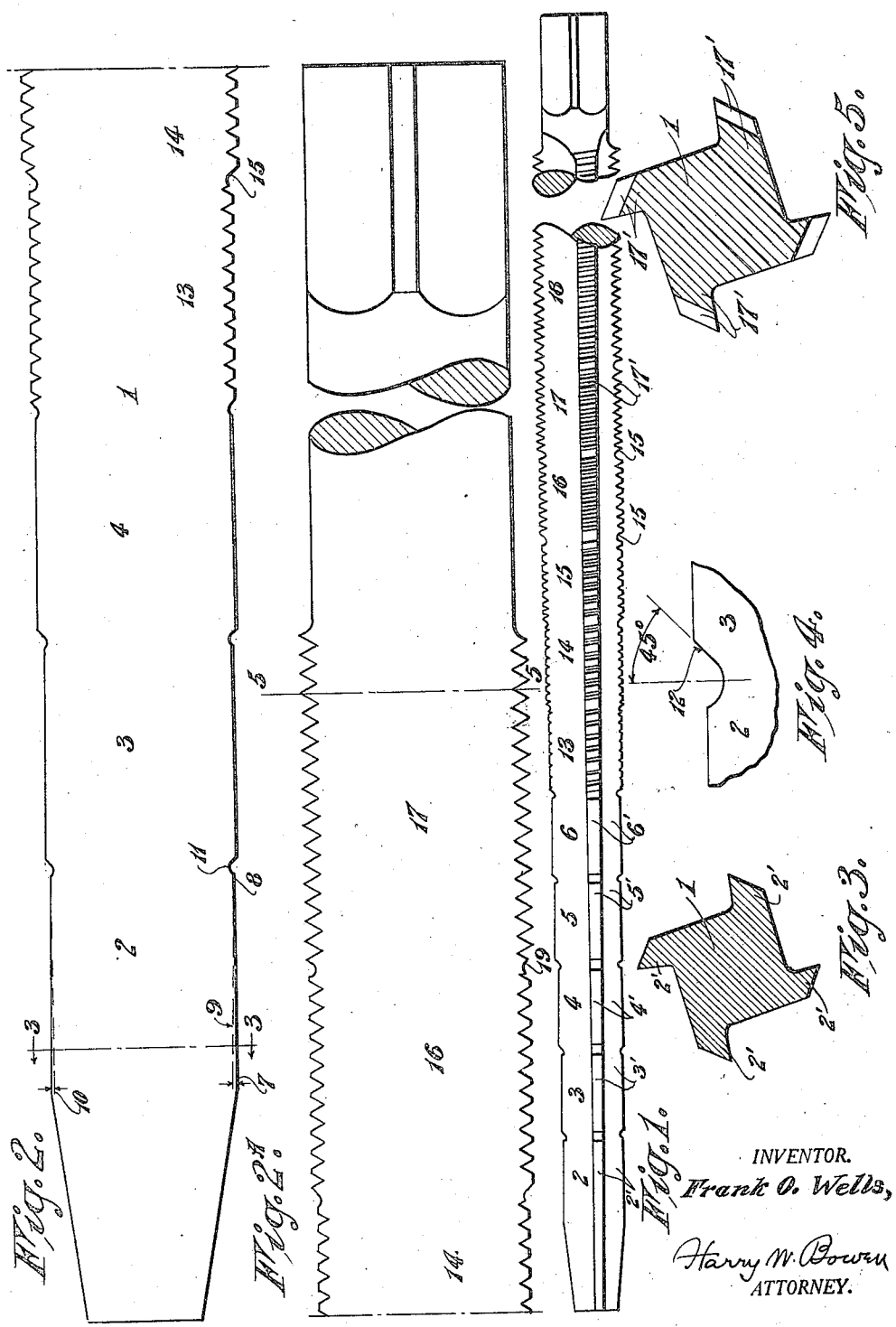

1,478,414

UNITED STATES PATENT OFFICE.

FRANK O. WELLS, OF GREENFIELD, MASSACHUSETTS.

STAY-BOLT TAP.

Application filed February 21, 1922. Serial No. 538,225.

*To all whom it may concern:*

Be it known that I, FRANK O. WELLS, a citizen of the United States of America, residing at Greenfield, in the county of Franklin and Commonwealth of Massachusetts, have invented certain new and useful Improvements in Stay-Bolt Taps, of which the following is a specification.

This invention relates to improvements in stay bolt taps and particularly to that form of tool in which the threads of the tap are combined with reaming or cutting elements.

An object of the invention is to provide a stay bolt tap of sufficient length for reaming and tapping holes that are used for attaching and securing stay bolts in boiler plates and other constructions where a tool embodying both the reamer and tapping feature would be useful.

The invention broadly comprises a tool having a series of reamer elements and a series of thread forming elements, the cutting or land portions of the series of reamer elements being of different diameters and tapered back from the entrance end of the tool, whereby a clearance space is provided between the different series of reamer and thread forming elements or steps, and whereby cutting edges are provided between each of the series of reamer elements or steps. Located back of the series of reamer elements or steps are a series of thread cutting elements the diameter of the series of thread cutting elements increasing successively from the forward end to the rear part of the tool. A tool having a series of reamer elements or steps and a series of thread cutting elements or steps of different diameters the tool will advance easily through the work without breaking the lands or the threads of the tap. By having the tool of sufficient length, the forward or entrance end will serve as a guide for the thread forming elements.

A further object is to provide a tool in which a portion only of its length can be used for reaming and tapping holes of different sizes if desired.

Referring to the drawings:

Fig. 1 is a plan view showing the complete tool with the series of reamer steps or elements of the cutting lands and the series of thread forming elements or steps of the tool.

Figs. 2 and 2ᴬ illustrate the tool, greatly enlarged for the purpose of representing the series of tapered portions of the reamer elements of the stay bolt tap and also the series of thread forming elements of different diameters.

Fig. 3 is a sectional view on the line 3—3 of Fig. 2 showing the first one of the series of reamer sections or steps of the tap in section and illustrating the shape of the cutting lands of the reamer.

Fig. 4 is a detail view showing the tapered or inclined entrance end of one of the lands or thread forming elements which are formed at an angle of substantially 45°. This inclined end serves as a cutting surface, and Fig. 5 is a sectional view on the line 5—5 of Fig. 2ᴬ showing the construction of the thread forming elements of this part of the stay bolt tap.

Referring to the drawings in detail:

1 designates the body portion of the tool. It is formed at its entrance end with a series of reamer lands designated as a whole by the reference numerals 2, 3, 4, 5, and 6 as shown in Fig. 1. Each one of these series of reamer lands is of different diameter and the lands increase gradually in size from the entrance end as shown in Fig. 2. The lands of each of these series are indicated at 2', 3', 4', 5', and 6'. The reamer section 2 shows the entrance end 7 of greater diameter than the rear portion of the same as indicated at 8. The difference or pitch being shown by the dotted line 9, also, by the space between the arrows, indicated at 10. In other words the diameter of each of the series of lands tapers rearwardly. The purpose of making each of the lands with a rearwardly extending taper is that their forward ends will serve as the cutting or reaming portions while the rear parts, being tapered, will merge into the recessed parts 11. These parts serve as cutting shoulders 12 for the lands of the succeeding reamer section which is of greater diameter. This construction is repeated between each pair of the reamer sections, it being understood that the diameter of the lands 3 is greater than that of the lands 2, that of 4 is greater than that of 3, and that of 5 greater than that of 4 and so on. As the tool advances in the work each one of the series of reamer sections will remove a metal chip which would be equal in thickness, represented by the difference in diameter of the two cuts, or of the two adjacent sections.

As the tool advances the diameter of the lands 6 being the largest one will leave the reamed opening ready to receive the thread cutting lands of the first series of the tap, indicated at 13. The diameter of this part of the tap is smaller than the diameter of the following portion of the tap indicated at 14. 15 indicates where the threads of the section or step 13 merge into the threads of the section 14, and forms a cutting surface of the lands of the following section to permit the threads 14 for example to readily follow the partially formed threads left by the section 13 of the tap. 16 and 17 indicate another series or steps of the tap of different diameters. The thread 14 merges into the threads of the section 16 of the tap as indicated at 18 and the threads of the section 16 of the tap merge into the threads of the section 17 of the tap at 19. The threads of the tap section 18 being the largest are the final cutting threads. In other words when one section ends another begins, as shown.

As a result of this construction it will be seen that the lands of the reamer part successively removes the metal of the opening until the larger diameter is formed and the threads of the tap sections 13, 14, 15, 16, 17, and 18 successively cut portions of the threads as the tap advances. The tool is particularly useful in reaming the openings and forming threads therein in boiler plates which are spaced from each other different distances for receiving the stay bolts used for the purpose of holding the plates spaced and firmly together. The threads of the lands of the tap section 17 are indicated in Fig. 5 at 17'.

It is of course, obvious that the tool as a whole may be run through the openings the whole of its length thus forming a perfect thread at the end, or a portion only of the tap may be used, that is reaming the holes in one plate and cutting a thread in the other.

It is, of course, obvious that the lands and thread forming portions may be made on a spiral instead of substantially parallel with the axis as shown in Fig. 1. The entering ends of the series of sections or steps of the reamer are formed on an angle of 45°, to provide a cutting surface for the entrance end of each of the reamer lands or the entrance end of each of the thread forming lands or sections. This inclined surface is indicated at 12 in Fig. 5.

What I claim is:

1. A tap construction comprising a member having a series of rearwardly tapered reamer elements of different diameters and a series of thread forming elements of different diameters.

2. A tool having a series of rearwardly tapered reamer elements and a series of thread forming elements arranged in succession along the length of the tool.

3. A tool having a series of reamer and a series of thread forming elements, arranged in succession along the length of the tool, the series of reamer elements being of different diameters and tapered away or back from the entrance end of the tool to form a clearance space and to provide cutting shoulders for the following series of elements.

4. A tool consisting of a combined reamer and tap, and having at its entrance end a series of reamer lands or elements, and at its other end a series of thread forming elements, the elements of each of said series being of different diameters.

5. A tool having a series of reamer elements, of different diameters to form a series of steps, that portion of the tool between the steps being formed to provide cutting surfaces for the lands of the following step, and back of the reamer elements a series of thread forming elements of different diameters, and cutting surfaces between the thread forming elements.

6. A tap construction comprising a member having a series of reamer elements, the rear portion of each element being of less diameter than the adjoining or forward end portion of the following reamer elements and a series of thread forming elements of different diameter than the series of reamer elements.

FRANK O. WELLS.